United States Patent
Broehmer et al.

(10) Patent No.: US 10,676,618 B2
(45) Date of Patent: Jun. 9, 2020

(54) POLAR-MODIFIED RICE HUSK WAX

(71) Applicant: Clariant International Ltd, Muttenz (CH)

(72) Inventors: Manuel Broehmer, Olching (DE); Halil Can Aran, Munich (DE); Erik Hauck, Pirmasens (DE); Gerd Hohner, Augsburg (DE); Stefanie Goeres, Worms (DE); Rosemarie Weber, Edenbergen (DE); Rainer Fell, Gersthofen (DE)

(73) Assignee: Clariant International Ltd, Muttenz (CH)

( * ) Notice: Subject to any disclaimer, the term of this patent is extended or adjusted under 35 U.S.C. 154(b) by 28 days.

(21) Appl. No.: 15/744,503

(22) PCT Filed: Jul. 14, 2016

(86) PCT No.: PCT/EP2016/066726
§ 371 (c)(1),
(2) Date: Jan. 12, 2018

(87) PCT Pub. No.: WO2017/009408
PCT Pub. Date: Jan. 19, 2017

(65) Prior Publication Data
US 2018/0237639 A1    Aug. 23, 2018

(30) Foreign Application Priority Data

Jul. 14, 2015 (DE) .................. 10 2015 213 187
Jun. 27, 2016 (DE) .................. 10 2016 211 452

(51) Int. Cl.
| | |
|---|---|
| *C08L 91/06* | (2006.01) |
| *C08F 289/00* | (2006.01) |
| *C08F 8/46* | (2006.01) |
| *C09F 1/04* | (2006.01) |
| *C08F 222/06* | (2006.01) |

(52) U.S. Cl.
CPC ............ *C08L 91/06* (2013.01); *C08F 8/46* (2013.01); *C08F 222/06* (2013.01); *C08F 289/00* (2013.01); *C09F 1/04* (2013.01)

(58) Field of Classification Search
CPC ...... C08L 91/06; C09D 191/06; C09J 191/06; C08J 2381/06; C09F 1/04; C08F 8/46; C08F 289/00

See application file for complete search history.

(56) References Cited

U.S. PATENT DOCUMENTS

| | | | | |
|---|---|---|---|---|
| 2,802,844 A | * | 8/1957 | Feuge | ............... C11B 11/00 554/177 |
| 3,933,512 A | | 1/1976 | Heintzelman et al. | |
| 5,058,607 A | * | 10/1991 | Carter | ............... C08G 18/638 131/58 |
| 8,563,134 B2 | | 10/2013 | Bach et al. | |
| 2002/0058774 A1 | * | 5/2002 | Kurth | ............... C08G 18/36 527/301 |
| 2005/0155157 A1 | | 7/2005 | Kensicher et al. | |
| 2012/0009423 A1 | | 1/2012 | Bach et al. | |
| 2014/0170346 A1 | | 6/2014 | Adam | |
| 2015/0056422 A1 | * | 2/2015 | Bastin | ............... B05D 7/57 428/203 |
| 2018/0237639 A1 | | 8/2018 | Broehmer | |

FOREIGN PATENT DOCUMENTS

| | | |
|---|---|---|
| CN | 102227450 A | 10/2011 |
| DE | 407245 C | 2/1925 |
| DE | 102009013902 A1 | 9/2010 |
| DE | 102010052789 A1 | 5/2012 |
| EP | 3322754 A1 | 5/2018 |
| JP | H01-167387 A | 7/1989 |
| JP | H08-208772 A | 8/1996 |
| JP | 2002-080602 A | 3/2002 |
| JP | 2003292987 A * | 10/2003 |
| WO | 92/07009 A2 | 4/1992 |
| WO | 2014/060081 A1 | 4/2014 |
| WO | 2017/009408 A1 | 1/2017 |

OTHER PUBLICATIONS

English specification of JP-2003292987-A.*
Partial machine translation of JP H01-167387.*
Machine translation of JP 2002-080602 A.*
Gunawan et al., "Purification and Identification of Rice Bran Oil Fatty Acid Steryl and Wax Esters", JAOCS, vol. 83, No. 5, pp. 449-456 (2006).

* cited by examiner

*Primary Examiner* — Kregg T Brooks
(74) *Attorney, Agent, or Firm* — Morgan, Lewis & Bockius LLP

(57) ABSTRACT

The invention provides polar-modified rice husk waxes obtainable by free-radical grafting of unmodified rice husk waxes with graft comonomers selected from the group of the α,β-unsaturated mono- or polybasic carboxylic acids or derivatives thereof. The invention further provides derivatization products prepared by chemical conversion of the polar-modified rice husk waxes of the invention. The invention further provides processes for producing the products of the invention and for the use thereof.

20 Claims, No Drawings

POLAR-MODIFIED RICE HUSK WAX

The present invention relates to polar-modified rice husk wax obtainable by free-radical grafting of unmodified rice husk wax with α,β-unsaturated mono- or polybasic carboxylic acids or derivatives thereof.

Rice husk wax or rice bran wax is obtained as a by-product in the processing of raw rice. It is obtained by extraction of rice bran and forms part of the group of the naturally occurring ester waxes. These further include the waxes that are likewise obtainable from plant constituents, of the carnauba wax, sugarcane wax, candelilla wax, sunflower wax, tree bark wax and straw wax type. Further naturally occurring ester waxes are isolated from fossil raw materials, and especially what is called montan wax, which is obtainable from particular brown coals, is of considerable industrial significance as a starting material for chemical refining.

The waxes mentioned consist predominantly of esters of long-chain carboxylic acids with long-chain alcohols and additionally contain, inter alia, resinous and coloring components. The chain lengths of the long-chain carboxylic acids and alcohols present in ester form in the natural ester waxes are typically in the range from $C_{22}$ to $C_{34}$; the chains predominantly have an even number of carbon atoms. The content of free carboxylic acids is low. Owing to their composition, the polarity of waxes of this kind is relatively low. For applications that require a high polarity, especially a high acid functionality they are therefore only of insufficient suitability. These applications include, for example, the production of wax dispersions in aqueous or other polar media.

The polarity of ester waxes can in principle be increased by hydrolytic or acid- or alkali-catalyzed cleavage, giving rise to mixtures of free carboxylic acids and free alcohols. The two components are then present in roughly equal amounts, meaning that the acid functionality of the overall mixture is limited. The cleavage of the ester wax molecules and the associated halving of the molecular mass additionally leads to a change in a multitude of product properties, sometimes in an adverse manner. For example, there is an increase in the volatility, which constitutes a problem at high processing temperatures, for instance in the case of use as a polymer additive.

To further increase the polarity, the hydrolytic cleavage may be followed by oxidation of the alcohol component to carboxylic acids. This has long been industrial practice in the case of montan wax; the oxidizing agent used here is typically chromosulfuric acid. An analogous method of oxidation of natural rice husk or rice bran wax is described in WO 2014060081. A disadvantage here is that the size of the molecule is roughly halved again. The use of chromosulfuric acid is additionally technically complex and economically costly and demanding from an occupational hygiene point of view.

Another method of increasing the polarity of montan wax is known from German published specification 407245. According to this, a rise in the acid number from 2 to 81 mg KOH/g is achieved by blowing an air stream into the wax melt at 160° C. The unspecific oxidation with air leads to degradation and hence to the formation of volatile by-products.

Japanese patent application JP H01167387 states that paraffin wax or carnauba wax can be free-radically grafted with unsaturated carboxylic acids or anhydrides thereof. The resulting products serve as additives for paraffin-based printing ink formulations ("thermal transfer inks"); they improve the dispersion of the (carbon black) pigment particles present in the formulations. The graft yield in the reaction of carnauba wax with maleic anhydride is low and the graft products are dark-colored.

There is a need to make rice husk wax, which is potentially available in large volumes within the scope of raw rice processing, more economically utilizable, for example via optimization of the use properties.

It has been found that, surprisingly, rice husk wax can be converted by free-radical grafting with α,β-unsaturated carboxylic acids or derivatives thereof in efficient graft yield to give highly polar and comparatively light-colored products with broad application potential. More particularly, it was found that the polar-modified rice husk wax of the invention offers advantages with regard to particular performance properties, including with regard to dispersibility in aqueous media.

The invention provides polar-modified rice husk waxes obtainable by free-radical grafting of unmodified rice husk waxes with graft comonomers selected from the group of the α,β-unsaturated mono- or polybasic carboxylic acids or derivatives thereof.

The invention further provides derivatization products prepared by chemical reaction of the polar-modified rice husk waxes of the invention.

The invention further provides processes for producing the products of the invention and for the use thereof.

Rice husk waxes are obtained as a by-product in the processing of raw rice (*Oryza sativa*). After the chaff adhering to the grains has been removed in the threshing of the mature rice plants and further husk constituents as well as other impurities have been separated in the rice mill, the rice grains still contain the germ and are encased by what is called the silverskin. The germ and silverskin are removed by abrasion and, as well as the polished rice, give the rice bran. This contains lipid components consisting predominantly of fatty oils and of a smaller percentage of waxy components. These can be found in the oil obtained from the bran by pressing or solvent extraction, from which it is isolated owing to its sparing solubility at low temperatures, for example by freezing it out. Rice husk wax consists mainly of esters of long-chain saturated unbranched fatty acids with long-chain unbranched aliphatic alcohols. In the acid component behenic acid and lignoceric acid with chain lengths of $C_{22}$ and $C_{24}$ are predominant, and in the alcohol component the chain lengths $C_{30}$, $C_{32}$ and $C_{34}$.

Unmodified rice husk wax in the sense of the invention is understood to mean the waxy constituents obtained from rice bran by any desired physical separation methods. Preference is given here to the wax components isolated from rice bran oil in a known manner, for example by freezing or extraction. These can be used as such ("raw rice wax") or after mechanical or generally physical purification, for example by treatment with bleaching earths and/or with activated carbon and/or after destruction of coloring impurities by treatment with hydrogen peroxide ("refined rice wax"). Purification methods of this kind leave the ester wax structure largely unchanged. It is also possible to subject each of the aforementioned processing stages additionally to fractionation by known methods and to process a selection from the fractions obtained further in the manner of the invention. Useful fractionation methods include, for example, extractive separation with organic solvents, for example ethanol, isopropanol, acetone, aliphatic open chain or alicyclic hydrocarbons such as hexane or cyclohexane or mixtures thereof.

Rice husk waxes that are suitable in accordance with the invention have acid numbers, determined according to DIN EN ISO 2114, between 3 and 20 mg KOH/g, hydrolysis numbers according to DIN EN ISO 3681 between 50 and 130 mg KOH/g, dropping points according to DIN 51801-2 between 70 and 87° C., and melt viscosities, measured according to DIN 53019 at 90° C. with a rotary viscometer, between 5 and 30 mPa·s.

Suitable graft comonomers include α,β-unsaturated mono- or polybasic carboxylic acids or derivatives thereof, the latter containing acid-equivalent groups, for example ester, anhydride or amide functions. Examples of carboxylic acids include acrylic acid, methacrylic acid or maleic acid; examples of derivatives of carboxylic acids include the esters or amides thereof, anhydrides, monoesters of maleic acid, for example monoalkyl maleates, diesters of maleic acid, for example dialkyl maleates, or amides of maleic acid, for example maleimide or N-alkyl-substituted maleimides. It is also possible to use mixtures of these compounds. Preference is given to maleic acid and derivatives thereof, particular preference to maleic anhydride. The polar component is used in the graft reaction in an amount, based on ester wax, of 0.1%-20% by weight, preferably 1.0%-15% by weight, more preferably 5.0% to 10% by weight.

Useful auxiliary reagents for the free-radical initiation of the graft reaction include compounds that break down to give free radicals to a sufficient degree under the reaction conditions ("free-radical initiators"). Organic peroxides are especially suitable, for example alkyl, aryl or aralkyl peroxides such as di-tert-butyl peroxide or dicumyl peroxide, peroxy esters such as tert-butyl peracetate or tert-butyl perbenzoate, hydroperoxides such as tert-butyl hydroperoxide or cumene hydroperoxide. Aliphatic azo compounds, for example azobis(2-methylpropionitrile) or 2,2'-azobis(2,4-dimethylvaleronitrile), are likewise suitable. Preference is given to dialkyl peroxides, particular preference to di-tert-butyl peroxide. The free-radical initiator is used in an amount, based on the rice husk wax, of 0.1%-5.0% by weight.

The reaction of the rice husk wax with the polar component can be effected, for example, in such a way that the rice husk wax is melted and the graft comonomer and the free-radical initiator are introduced into the melt while stirring. The reaction temperature is above the dropping point of the rice husk wax, preferably between 130 and 180° C. The end of the metered addition may be followed—optionally after addition of an additional amount of peroxide—by further reaction at altered or unaltered temperature. Volatile components formed during the reaction and excess, unbound graft comonomer are removed, for example by distillative removal, optionally under reduced pressure, by stripping with inert gas or by washing out with suitable solvents or by combination of two or more of these measures.

A measure of the efficiency of the graft reaction is what is called the graft yield, which states the proportion of graft monomer used that has been converted. If the graft reaction is conducted by means of α,β-unsaturated carboxylic acids or anhydrides thereof, an index used for the graft yield may also be the difference in acid number between the starting material and end product, based on the relative use amount of graft comonomers.

The polar-modified rice husk wax has acid numbers, measured according to DIN EN ISO 2114, of 2 to 120 mg KOH/g, preferably of 20 to 100 mg KOH/g, more preferably of 30 to 80 mg KOH/g.

The melt viscosities, measured with a rotary viscometer according to DIN 53019 at 90° C., are between 20 and 500 mPa·s, preferably between 35 and 350 mPa·s, more preferably between 40 and 300 mPa·s.

The dropping points, measured according to DIN 51801-2, vary between 40 and 90° C., preferably between 50 and 90° C., more preferably between 60 and 85° C.

The acid groups or acid-equivalent groups introduced by the graft reaction, just like the ester groups originally present in the wax raw material, may optionally be converted further in subsequent reactions to derivatization products. Examples of such derivatizations are esterification, amidation, hydrolysis, ethoxylation or decarboxylation reactions or else anhydride formation. Especially in the case that the rice husk wax has been grafted with an unsaturated anhydride, the anhydride rings present in the wax molecule are opened by hydrolysis or saponification or by reaction with alcohols, so as to result in carboxylic acids, soaps or esters or monoesters.

Preferred derivatization products are metal soaps. They are in principle prepared by contacting the polar-modified rice husk wax with a metal compound that converts the acid or acid-equivalent groups present in the wax partly or completely to carboxylate functions. The metal compounds used contain metals, preferably of groups IA, IIA, IIIA, IB, IIB and VIIIB of the Periodic Table, more preferably alkali metals and alkaline earth metals. Useful metal compounds in general are those that can be reacted with acid or acid-equivalent functions to give metal carboxylates, for example hydroxides or oxides. It is also possible to use metal compounds having salt character, especially salts of volatile acids, for example carbonates. Preference is given, however, to hydroxides and or oxides. Examples include sodium hydroxide or potassium hydroxide and calcium oxide or hydroxide and magnesium oxide or hydroxide. In a preferred preparation process, a heated aqueous solution or dispersion of the metal compound is initially charged and the polar-modified rice husk wax is introduced, optionally while stirring.

The ratio of metal compound used and polar-modified rice husk wax used is chosen so as to achieve a hydrolysis level of at least 1%, preferably at least 10%, more preferably at least 20%. The hydrolysis level states the percentage stoichiometric proportion of the acid or acid-equivalent groups originally present that has been converted to carboxylate.

There is a multitude of possible uses for the polar-modified ester waxes and the derivatization products thereof. Aqueous or solvent-based dispersions of the products of the invention can be used as formulation components in care products for automobiles, footwear, furniture and floors and for industrial dispersions, for example for facade paints and marine paints, for textile processing or for citrus fruit coating. Advantages over known waxes are found to be better dispersibility in water and polar solvents. The coatings that result on application of the dispersions to surfaces have high gloss values and elevated coefficients of sliding friction.

They are thus suitable, for example, as a formulation component in care products for increasing gloss and slip resistance. In addition, the products can be used as a component in hotmelt adhesive compositions, as a dispersant for pigment masterbatch formulations for coloring plastics, as an additive, for example as a lubricant additive in plastics processing, as an adhesion promoter in composite materials, for example made from plastics and wood or plastics and glass fibers, as a compatibilizer in blends of different polymers or as an adhesion promoter in the inner coating of drink and food cans.

EXAMPLES

The examples which follow are intended to illustrate the invention in detail, but without restricting it to specifically stated embodiments.

Examples 1-11

Modification of Ester Waxes with Maleic Anhydride 500 g of the ester wax raw materials stated in table 1 were initially charged in a glass apparatus equipped with a stirrer system, internal thermometer, metering apparatus and distillation system under nitrogen and melted. At a temperature of 150° C., the stated amount of maleic anhydride was metered into the melt within 3 hours. At the same time, 7.5 g of di-tert-butyl peroxide were added dropwise from a dropping funnel. On completion of addition, the mixture was stirred at 150° C. for another 1 h and then, after applying reduced pressure (20 mbar), volatile compounds and unconverted maleic anhydride was distilled off.

Table 1 shows the indices of various ester waxes and the maleated graft products thereof. Acid and hydrolysis numbers rise with the use amount of maleic anhydride. The graft yields in the case of the inventive examples (rice husk wax) are much higher compared to the noninventive comparative examples. (An index used for the graft yield here is the rise in acid number per % by weight of maleic anhydride used.) Furthermore, the product colors, measured as the Gardner color number, are lighter.

Examples 12, 13

Hydrolysis and Saponification of Maleic Anhydride-Modified Refined Rice Husk Wax with Calcium Hydroxide

Example 12

In a 2 L beaker, 100 g of pulverized, maleic anhydride-modified refined rice husk wax (from example 1) were scattered into a dispersion of 19 g of calcium hydroxide in 510 mL of distilled water at 90° C. such that the temperature of the mixture never fell below 85° C. After filtration and drying at 80° C., the product was obtained as a yellow powder with an acid number of 32 mg KOH/g and a calcium content of 7.8% by weight.

TABLE 1

Analytical data of the ester waxes used and graft products thereof with maleic anhydride (MA)

| Example | Raw material | Ester wax used | | | | Amount |
|---|---|---|---|---|---|---|
| | | Acid number mg KOH/g | Hydrolysis number mg KOH/g | Dropping point ° C. | Melt viscosity at 90° C. mPa · s | of MA used % by wt.** |
| 1 (inv.) | Refined rice husk wax | 8.1 | 88.2 | 78.2 | 17.3 | 9.0 |
| 2 (inv.)* | Refined rice husk wax | 8.1 | 88.2 | 78.2 | 17.3 | 9.0 |
| 3 (inv.)* | Refined rice husk wax | 8.1 | 88.2 | 78.2 | 17.3 | 9.0 |
| 4 (inv.) | Refined rice husk wax | 8.1 | 88.2 | 78.2 | 17.3 | 5.0 |
| 5 (inv.) | Refined rice husk wax | 8.1 | 88.2 | 78.2 | 17.3 | 13.0 |
| 6 (comp.) | Licowax E | 17.1 | 148.8 | 82.1 | 34.0 | 9.0 |
| 7 (comp.) | Carnauba T1 prime yellow | 7.0 | 97.1 | 82.7 | 35.9 | 9.0 |
| 8 (comp.) | Carnauba T3 light fatty grey | 11.9 | 93.5 | 83.6 | 51.0 | 9.0 |
| 9 (comp.) | Deresinified sugarcane wax | 18.3 | 117.0 | 83.7 | 97.3 | 9.0 |
| 10 (comp.) | Raw sugarcane wax | 19.7 | 119.0 | 78.8 | 47.2 | 9.0 |
| 11 (comp.) | Sunflower wax | 2.8 | 103.0 | 79.3 | 14.0 | 9.0 |

| Example | Product | | | | | |
|---|---|---|---|---|---|---|
| | Acid number mg KOH/g | Graft yield*** mg KOH/g/ % by wt. of MA | Hydrolysis number mg KOH/g | Dropping point ° C. | Melt viscosity at 90° C. mPa · s | Gardner color number |
| 1 (inv.) | 54.8 | 5.19 | 152.1 | 78.1 | 127.6 | 9.8 |
| 2 (inv.)* | 54.9 | 5.20 | 150.4 | 79.1 | 130.0 | 9.3 |
| 3 (inv.)* | 55.0 | 5.21 | 149.3 | 78.7 | 112.3 | 8.6 |
| 4 (inv.) | 35.0 | 5.38 | 120.8 | 77.6 | 48.6 | 7.4 |
| 5 (inv.) | 74.0 | 5.07 | 173.2 | 78.4 | 282.0 | 11.2 |
| 6 (comp.) | 50.1 | 3.67 | 195.9 | 80.9 | 123.0 | >18 |
| 7 (comp.) | 34.0 | 3.00 | 123.9 | 81.9 | 167.2 | 17.5 |
| 8 (comp.) | 33.8 | 2.53 | 134.0 | 81.9 | 186.5 | >18 |
| 9 (comp.) | 46.7 | 3.16 | 161.5 | 79.7 | 122.0 | >18 |
| 10 (comp.) | 57.9 | 4.24 | 167.8 | 79.4 | 219.3 | >18 |
| 11 (comp.) | 33.0 | 3.36 | 176.6 | 76.1 | 109.2 | 12.5 |

*Examples 2 and 3 are repetitions of example 1 and serve to verify reproducibility;
**based on wax used;
***calc. as difference in product/reactant acid number based on MA used (Δ AN % by weight of MA).

Example 13

In a 7 L metal pot, 700 g of pulverized, maleic anhydride-modified refined rice husk wax (from example 1) were scattered into a dispersion of 266 g of calcium hydroxide in 5.0 L of distilled water at 90° C. such that the temperature of the mixture never fell below 85° C. The mixture was left to cool down to room temperature while stirring. After filtration and drying at 80° C., the product was obtained as a yellow powder with an acid number of 2.1 mg KOH/g and a calcium content of 13.0% by weight.

Examples 14-18

Production of Aqueous Anionic Dispersions

Dispersion was effected by melting the components specified in table 2 together while stirring at 120° C., adding boiling deionized water, stirring for a further 2 minutes and rapidly cooling (water bath) the dispersion obtained to room temperature.

The oleic acid content of the dispersions was matched to the acid number of the waxes used.

The solids content and the transparency of the dispersions were determined.

TABLE 2

Anionic dispersions

| Component | 14 (comp.) | 15 (inv.) | 16 (inv.) | 17 (inv.) | 18 (comp.) |
|---|---|---|---|---|---|
| Refined rice husk wax | 20.0 | | | | |
| Example 4 (refined rice husk wax, grafted with 5% MA) | | 20.0 | | | |
| Example 1 (refined rice husk wax, grafted with 9% MA) | | | 20.0 | | |
| Example 5 (refined rice husk wax, grafted with 13% MA) | | | | 20.0 | |
| Example 8 (Carnauba T3, grafted with 9% MA) | | | | | 20.0 |
| Oleic acid | 6.7 | 3.9 | 1.6 | — | 4.1 |
| Diethylaminoethanol | 3.10 | 3.10 | 3.10 | 3.10 | 3.1 |
| Hot deionized water | 70.20 | 73.00 | 75.30 | 75.9 | 72.80 |
| Appearance | milky, viscous, coarse dispersion | yellowish, slightly cloudy | yellowish, opaque | light brown, very finely divided | dark brown, cloudy |
| Transparency after 3 weeks [%] | 0.0 | 13.5 | 19.4 | 22.4 | 5.0 |

Transparency is a measure of the fineness of the dispersion. Finely dispersed wax dispersions are more stable and lead, for example, to elevated imparting of shine in care products.

TABLE 3

Gloss and sliding friction of the self-shine dispersions

| Component | Underlying wax in the anionic dispersion | 19 (comp.) | 20 (inv.) | 21 (inv.) | 22 (inv.) |
|---|---|---|---|---|---|
| Deionized water | | 48.1 | 46.7 | 45.0 | 45.5 |
| Tris(2-butoxyethyl) phosphate | | 1.8 | 1.8 | 1.8 | 1.8 |
| EDG | | 2.6 | 2.6 | 2.6 | 2.6 |
| Ammonia | | 0.1 | 0.1 | 0.1 | 0.1 |
| Licomer M 55 | | 35.8 | 35.8 | 35.8 | 35.8 |
| Ex. 14 | Refined rice husk wax | 7.5 | | | |
| Ex. 15 | Refined rice husk wax, grafted with 5% MA | | 8.8 | | |
| Ex. 16 | Refined rice husk wax, grafted with 9% MA | | | 10.6 | |
| Ex. 17 | Refined rice husk wax, grafted with 13% MA | | | | 10.0 |
| Syncera LP 1476, 30% | | 3.1 | 3.1 | 3.1 | 3.1 |
| Genapol X-080 | | 0.8 | 0.8 | 0.8 | 0.8 |
| Silco FLW L-137 | | 0.1 | 0.1 | 0.1 | 0.1 |
| Saniprot 94-08 | | 0.1 | 0.1 | 0.1 | 0.1 |
| Gloss (black paper) | | 56 GU | 90 GU | 89 GU | 88 GU |
| Coefficient of sliding friction | | 0.54 | 0.60 | 0.65 | 0.71 |

The self-shine dispersions were produced by blending the components listed in tab. 3. The dispersions were applied to black paper (test card, Simex GmbH) with a 24 μm coating bar. After drying, coefficients of sliding friction and gloss were determined. The coefficients of sliding friction (and hence the slip resistances) of the products of the invention are much higher than in the case of unmodified rice husk wax; they rise with the proportion of grafted maleic anhydride content. The dispersions of the modified rice husk waxes show improved gloss compared to the unmodified starting material.

Examples 23, 24

Production of Aqueous Nonionic Dispersions of the Waxes of the Invention

Dispersion was effected by melting the components stated in table 4 together while stirring at 120° C., adding boiling deionized water, stirring for a further 2 minutes and rapidly cooling (water bath) the dispersion obtained to room temperature.

The dispersions were applied to black paper (test card, Simex GmbH) with a 24 μm coating bar. After drying, the gloss and coefficients of sliding friction were determined.

TABLE 4

| | Nonionic dispersions | |
|---|---|---|
| | Example [% by wt.] | |
| Component | 23 (comp.) | 24 (inv.) |
| Refined rice husk wax | 10.4 | |
| Example 1 (refined rice husk wax, grafted with 9% MA) | | 10.4 |

TABLE 4-continued

| | Nonionic dispersions | |
|---|---|---|
| | Example [% by wt.] | |
| Component | 23 (comp.) | 24 (inv.) |
| Wax emulsifier 4106 | 3.0 | 3.0 |
| Deionized water | 86.6 | 86.6 |
| Appearance | not dispersible | light brown, very finely divided |
| Gloss (black paper) | — | 65.7 GU |
| Coefficient of sliding friction | — | 0.80 |

The nonionic dispersion of refined rice husk wax according to the formulation specified in table 4 was not possible. The polar-modified variant had good dispersibility.

Examples 25-31

Production of Hotmelt Adhesives

Using the waxes listed in table 5, hotmelt adhesives were produced. For this purpose, mixtures of 15.0 g of Engage 8407, 15.0 g of Licocene PP 1502, 30.0 g of Sukorez SU-90, 30.0 g of Licowax PE 520 and 10.0 g of the respective test waxes were melted and stirred at 170° C. for one hour.

Example 25 describes a standard formulation that finds wide use in the bonding of cardboard packaging.

Examples 26-28 show examples in which the waxes of the invention were used as test waxes. For comparative examples 29-31, noninventive modified ester waxes were used.

For assessment of the properties, tensile strength, open time and setting time were determined.

TABLE 5

| | Hotmelt adhesives | | | |
|---|---|---|---|---|
| Example | Wax used | Melt viscosity at 150° C. mPa · s | Tensile shear strength wood/wood MPa | Open time s | Setting time s |
| 25 (comp.) | Semi Hard Micro 75 | 3498 | 1.7 | <2 | 2 |
| 26 (inv.) | Example 4 (refined rice husk wax, grafted with 5% MA) | 3374 | 2.5 | 8 | 2 |
| 27 (inv.) | Example 1 (refined rice husk wax, grafted with 9% MA) | 2771 | 2.5 | 7 | 2 |
| 28 (inv.) | Example 5 (refined rice husk wax, grafted with 13% MA) | 3525 | 3.2 | <2 | 2 |
| 29 (comp.) | Example 11 (deresinified sugarcane wax, grafted with 9% MA) | 4653 | 1.9 | <2 | 6 |
| 30 (comp.) | Example 12 (raw sugarcane wax, grafted with 9% MA) | 4602 | 1.4 | <2 | 2 |
| 31 (comp.) | Example 9 (Carnauba T1, grafted with 9% MA) | 3948 | 2.0 | <2 | 2 |

The hotmelt adhesives of the invention show higher tensile shear strengths, which improves the stability of the bonds. Higher open times, especially in the case of manual adhesive bonding or in the event of a brief machine shutdown, have the advantage that the hotmelt adhesive does not cure before the parts to be bonded can be brought together. This is particularly advantageous when the setting time remains short at the same time.

Raw Materials Used:

"Refined rice husk wax" is a bleached and purified rice husk wax from Shengtao having the following indices:
Acid number: 8.1 mg KOH/g
Hydrolysis number: 88.2 mg KOH/g
Hydroxyl number: 15.5 mg KOH/g
Dropping point: 78.2° C.
Melt viscosity (100° C.): 17.3 mPa·s "Licowax E" is a chromosulfuric acid-oxidized and ethylene glycol-esterified montan wax from Clariant Produkte (Deutschland) GmbH having the following indices:
Acid number: 18.0 mg KOH/g
Hydrolysis number: 148.8 mg KOH/g
Dropping point: 82.1° C.
Melt viscosity (100° C.): 34.0 mPa·s "Carnauba T1" is a natural ester wax obtained from the leaves of carnauba palms from Ter Hell & Co. GmbH ("Carnaubawax T1 primeyellow") having the following indices:
Acid number: 7.0 mg KOH/g
Hydrolysis number: 97.1 mg KOH/g
Dropping point: 82.7° C.
Melt viscosity (100° C.): 35.9 mPa·s "Carnauba T3" is a natural ester wax obtained from the leaves of carnauba palms from Ter Hell & Co. GmbH ("Carnaubawax T3 light fatty grey") having the following indices:
Acid number: 11.9 mg KOH/g
Hydrolysis number: 93.5 mg KOH/g
Dropping point: 83.6° C.
Melt viscosity (100° C.): 51.0 mPa·s "Sunflower wax" is a purified wax obtained from sunflower oil from Lohia Brothers Private Ltd. (Sun flower wax Grade H A 1) having the following indices:
Acid number: 2.8 mg KOH/g
Hydrolysis number: 102.0 mg KOH/g
Dropping point: 79.3° C.
Melt viscosity (100° C.): 14.0 mPa·s "Raw sugarcane wax" is a wax obtained from sugarcane bagasse from Deurex AG ("Deurex X 50") having the following indices:
Acid number: 19.7 mg KOH/g
Hydrolysis number: 119.0 mg KOH/g
Dropping point: 78.8° C.
Melt viscosity (100° C.): 47.2 mPa·s "Deresinified sugarcane wax" was produced by extraction of the "raw sugarcane wax" Deurex X 50 with dichloromethane as follows: 200 g of Deurex X 50 and 400 g of ethanol were initially charged and heated to boiling for 1 h. Subsequently, the mixture was cooled down to 50° C. and the stirrer was switched off. The ethanol phase was separated from the solidified wax by filtration. The wax was washed with 100 g of ethanol at 45° C. 11.0 g of a brown residue ("resin") were obtained from the ethanol phase. The wax was dried under reduced pressure and 183.5 g of a light brown wax ("deresinified sugarcane wax") were obtained with the following indices:
Acid number: 18.3 mg KOH/g
Hydrolysis number: 117.0 mg KOH/g
Dropping point: 83.7° C.
Melt viscosity (90° C.): 97.3 mPa·s Licomer M 55 is an aqueous styrene-acrylate copolymer dispersion from Michelman, Inc.

Syncera LP 1476 is an aqueous emulsion of LDPE and paraffin wax from Paramelt B.V.

Genapol X-080 is a fatty alcohol ethoxylate from Clariant Produkte (Deutschland) GmbH.

Silco FLW L-137 is a leveling additive from Silcona GmbH & Co. KG.

Saniprot 94-08 is an antimicrobial additive from Clariant Produkte (Deutschland) GmbH.

Wax emulsifier 4106 is a fatty alcohol ethoxylate mixture from Clariant Produkte (Deutschland) GmbH.

Engage 8407 is an ethylene/1-octene copolymer from Dow Chemical.

Licocene PP 1502 is a metallocene polypropylene wax from Clariant Produkte (Deutschland) GmbH with the following indices:
Softening point: 86.0° C.
Melt viscosity (170° C.): 1760 mPa·s Sukorez SU-90 is a hydrogenated dicyclopentadiene resin from Kolon Hydrocarbon Industries.

Licowax PE 520 is a polyethylene wax from Clariant Produkte (Deutschland) GmbH with the following indices:
Dropping point: 119.2° C.
Melt viscosity (140° C.): 562 mPa·s Semi hard micro 75 is a paraffin wax from Paramelt B.V. with the following indices:
Dropping point: 75.0° C.

Determination of the Chemical and Physical Indices:

Acid Number:
The acid number is determined according to DIN EN ISO 2114.

Hydrolysis Number:
The hydrolysis number is determined according to DIN EN ISO 3681.

Dropping Point:
The dropping point is determined according to DIN 51801/2.

Softening Point:
The softening point is determined according to ASTM D36.

Melt Viscosity:
The melt viscosity is determined according to DIN 53019 with a rotary viscometer as follows:

The wax melt to be examined is present in an annular gap between two coaxial cylinders, one of which rotates at constant speed (rotor), the other being at rest (stator). What is determined is the torque which—at a given speed—is needed to overcome the friction resistance of the liquid in the annular gap. The geometric dimensions of the system and the torque and speed values determined can be used to calculate the shear stress that exists in the liquid and the shear rate and hence the viscosity.

Gardner Color Number:
The Gardner color number is determined according to ISO 4630-2 as follows:

The wax to be examined is heated in a test tube (diameter 11 mm, Dr. Lange, Germany) and in an aluminum block. Immediately after a clear melt has formed, the Gardner color number is determined with a Lico® 500 colorimeter (Dr. Lange, Germany).

Calcium Content:
The calcium content is determined in accordance with DGF-M-IV 4 (63) ("Deutsche Einheitsmethoden zur Untersuchung von Fetten, Fettprodukten, Tensiden and verwandten Stoffen" [German Uniform Methods for Analysis of Fats, Fat Products, Surfactants and Related Substances]).

In a 150 mL beaker, 2.0 g of the wax sample are dissolved in 60 mL of a xylene/ethanol mixture (10:1 [v/v]). The solution is titrated with 0.5 M ethanolic HCl solution up to the steepest gradient (DL 53 titrator, Mettler, DGi113-SC pH electrode). The calcium content is calculated by the formula:

$$Ca \%[m/m]=(V [mL] \times c [mol/L] \times M [g/mol] \times T \times 100\%)/W [g] \times 1000 mL \times N$$

where
V is consumption of HCl solution
c is concentration of the HCl solution
M is molecular weight of calcium
T is titre of the HCl solution
W is weight of the wax sample
N is (normality of the HCl compared to calcium ions).

Solids Content:
The solids content is determined with a halogen moisture analyzer (HB43, Mettler Toledo).

Transparency:
The wax dispersion is introduced into a round cuvette (diameter 11 mm) and the transparency is determined at 20° C. with a colorimeter (Lico 500 colorimeter, from Dr. Lange).

Gloss:
The gloss is determined according to DIN EN ISO 2813 with a reflectometer (micro-TRI-gloss from Byk Gardner) at a measurement angle of 60°. The measurement result is reported in the unit GU ("gloss units").

Coefficient of Sliding Friction:
The coefficient of sliding friction is determined with a friction peel tester, model 225-1, from the Thwing-Albert Instruments Company in accordance with ASTM Method D2534. For this purpose, a paper coated with the wax dispersion to be tested is applied to the analysis system. Subsequently, a leather-covered metal sledge (349 g) is placed onto the coated surface. The sledge is then pulled over the coated paper surface at constant speed (15 cm/min). The force required for the pulling of the sledge is measured. Since it is the dynamic coefficient of sliding friction that is being determined, the initial force which is required to set the sledge in motion can be neglected.

Tensile Shear Strength:
The tensile shear strength is determined according to DIN EN 1465 as follows:

The molten hotmelt adhesive is applied with a spatula over the area of a test specimen (from Rokoll GmbH, 100×20×0.5 mm, steamed beechwood test specimens, planed surface) at 170° C., and joined to a second test specimen of identical design over an overlap length of 20 mm. After cooling, the sample is stored at room temperature for 7 days. Subsequently, the tensile shear strength is determined (Z010 tensile tester from Zwick/Roell; pulling speed: 50 mm/min; clamped length: 115 mm; measurement length: 50 mm).

Open Time:
The open time is determined at 170° C. with a 500 μm bar-coated melt film on an uncoated cardboard surface. For this purpose, paper strips (1×5 cm) are pressed onto the cooling melt film every second. After the hotmelt adhesive has cured completely, the paper strips are pulled off. When the fibers do not break out completely at the bonding site, the end of the open time has been reached.

Setting Time:
To determine the setting time, a bead of the hotmelt adhesive is applied to a paper strip (1.5×12 cm) and a second paper strip is pressed on with an overlap. After the given time, the strips are pulled apart. If the papers can be detached from one another without complete tearing of the fibers, the setting time has not yet been attained and another experiment is conducted, in which the time before the papers are pulled apart is increased by 1 s. If there is complete tearing of the fibers, the setting time has been attained.

The invention claimed is:

1. A polar-modified rice husk wax obtained by free-radical grafting of unmodified rice husk wax with one or more graft comonomers selected from the group consisting of α,β-unsaturated mono- or polybasic carboxylic acids and derivatives thereof selected from the group consisting of esters, amides and anhydrides, wherein the polar-modified rice husk wax has an acid number of 2 to 120 mg KOH/g, a melt viscosity measured at 90° C. of 20 to 500 mPa·s and a dropping point of 40 to 90° C.

2. The polar-modified rice husk wax as claimed in claim 1, wherein the graft comonomer is maleic anhydride.

3. A process for producing the polar-modified rice husk wax as claimed in claim 1, comprising reacting refined rice husk wax with an α,β-unsaturated mono- or polybasic carboxylic acid or with a derivative thereof selected from the group consisting of an ester, an amide and an anhydride in the presence of a free-radical initiator to form the polar-modified rice husk wax.

4. A product obtained from the polar-modified rice husk wax as claimed in claim 1, where the polar-modified rice husk is subjected to one or more of hydrolysis, alcoholysis, esterification, amidation, hydrolysis, ethoxylation, anhydride formation and decarboxylation.

5. A hydrolysis product formed by hydrolysis of the polar-modified rice husk wax as claimed in claim 1, wherein the hydrolysis is effected with metal oxides, metal hydroxides or metal carbonates.

6. An aqueous dispersion comprising the polar-modified rice husk wax as claimed in claim 1.

7. A solvent-based dispersion comprising the polar-modified rice husk wax as claimed in claim 1.

8. A lubricant additive in plastics comprising the polar-modified rice husk wax as claimed in claim 1.

9. A dispersant for pigment masterbatch formulation for coloring of plastics comprising the polar-modified rice husk wax as claimed in claim 1.

10. An adhesion promoter in composite materials composed of plastics and wood or plastics and glass fibers comprising the polar-modified rice husk wax as claimed in claim 1.

11. A compatibilizer in blends of different plastics comprising the polar-modified rice husk wax as claimed in claim 1.

12. A hotmelt adhesive comprising the polar-modified rice husk wax as claimed in claim 1.

13. A solvent-containing paste comprising the polar-modified rice husk wax as claimed in claim 1.

14. An aqueous dispersion comprising a derivatization product of the polar-modified rice husk wax as claimed in claim 1.

15. A solvent-based dispersion comprising a derivatization product of the polar-modified rice husk wax as claimed in claim 1.

16. A lubricant additive in plastics comprising a derivatization product of the polar-modified rice husk wax as claimed in claim 1.

17. A dispersant for pigment masterbatch formulation for coloring of plastics comprising a derivatization product of the polar-modified rice husk wax as claimed in claim 1.

18. An adhesion promoter in composite materials composed of plastics and wood or plastics and glass fibers comprising a derivatization product of the polar-modified rice husk wax as claimed in claim 1.

19. A hotmelt adhesive comprising a derivatization product of the polar-modified rice husk wax as claimed in claim 1.

20. A solvent-containing paste comprising a derivatization product of the polar-modified rice husk wax as claimed in claim 1.

* * * * *